United States Patent [19]

Faig

[11] 3,994,192

[45] Nov. 30, 1976

[54] CIRCULAR SAW APPARATUS INCLUDING SAFETY LOCKING MEANS

[75] Inventor: Paul Faig, Unterensingen, Germany

[73] Assignee: Chr. Eisele Maschinenfabrik, Kongen, Germany

[22] Filed: May 27, 1975

[21] Appl. No.: 580,738

[30] Foreign Application Priority Data

June 14, 1974 Germany.................... 7420476[U]

[52] U.S. Cl. .............................. 83/490; 83/DIG. 1
[51] Int. Cl.² ..................... B23D 45/04; B27B 5/36
[58] Field of Search............... 83/490, 471.3, 471.2, 83/DIG. 1; 51/33 R, 99

[56] References Cited
UNITED STATES PATENTS

| 1,093,513 | 4/1914 | Williams............................... 83/490 |
| 2,326,293 | 8/1943 | Gast................................. 83/490 X |
| 2,568,799 | 9/1951 | Fuller.............................. 83/490 X |
| 2,842,168 | 7/1958 | Truchan............................ 83/490 |
| 3,130,621 | 4/1964 | Else................................ 83/490 X |
| 3,274,876 | 9/1966 | Debus.............................. 83/490 X |

Primary Examiner—Frank T. Yost
Attorney, Agent, or Firm—Lawrence E. Laubscher

[57] ABSTRACT

Circular saw apparatus is disclosed of the type including saw frame means pivotally connected with a base for pivotal movement between a normal non-cutting position and a cutting position, characterized by the provision of safety locking means for releasably locking the saw frame in the non-cutting position. The locking means includes a stationary locking member connected with the base, a movable locking member movably connected with the saw frame, and spring means normally biasing the movable locking member into engagement with a locking surface on the stationary locking member. Releasing means are provided for releasing the movable locking member from engagement with the locking surface, said releasing means being associated with the hand lever means provided for swinging the saw frame toward the cutting position.

7 Claims, 7 Drawing Figures

CIRCULAR SAW APPARATUS INCLUDING SAFETY LOCKING MEANS

BACKGROUND OF THE INVENTION

It is known in the prior art to provide circular sawing apparatus including a saw frame which is pivotally connected with a base for pivotal movement between cutting and non-cutting positions. Quite often the saw frame is so designed that it is normally biased (by gravity, for example) toward the non-cutting position. Thus, when the saw frame is in the cutting position and is released by the operator, it will automatically be returned to its non-cutting position. In actual practice, quite often the saw frame is inadvertently and unexpectedly displaced from the non-cutting position toward the cutting position (as, for example, where by negligence the operator, in spite of the placement of a protective shield over the saw blade, permits his shirt sleeve to contact the rotating blade, whereupon the shirtsleeve becomes entangled in the blade and the operator, in an effort to remove his arm from the range of the saw blade, swings the saw frame down toward the cutting position).

STATEMENT OF THE INVENTION

The present invention was developed to avoid the above and other drawbacks of the known circular sawing apparatus and to provide a safety locking means for releasably locking the saw frame in the non-cutting position.

SUMMARY OF THE INVENTION

Accordingly, a primary object of the present invention is to provide an improved circular saw apparatus including safety locking means for locking the pivotally movable saw frame in the non-cutting position relative to the base. Preferably the circular saw apparatus is of the type in which the saw frame is biased automatically toward the non-cutting position, hand lever means being provided for pivoting the saw frame toward the cutting position.

According to a more specific object of the invention, the locking means includes a stationary locking member connected with the base, a movable locking member movably connected with the frame, spring means biasing the movable locking member into engagement with the stationary locking member, and releasing means associated with the hand lever for releasing the movable locking member from the stationary locking member. In one embodiment, the movable locking member comprises an axially displaceable locking pin a lateral surface of which is adapted to engage an end locking surface on the stationary locking member. During pivotal movement of the saw frame between its cutting and non-cutting positions, the free extremity of the locking pin frictionally engages a convex curved surface on the stationary locking member, which curved surface is generally concentrically arranged with respect to the pivot axis of the saw frame. In a second embodiment, the locking member comprises an eccentric cam member pivotally connected with the frame for pivotal movement about an axis parallel with the saw frame pivot axis relative to a convex curved surface arranged on the stationary locking member concentrically about the frame pivot axis. In a third embodiment, the movable locking member comprises an axially displaceable truncated conical roller which is adapted for locking engagement with a corresponding truncated surface arranged on the face of the stationary locking member concentricaly about the saw frame pivot axis. In each of these three embodiments, the movable locking member is operated by a rod that is mounted for axial displacement in a bore contained in the hand lever. In a further embodiment, the hand lever is rotatably connected with the frame for rotation about its axis, and the movable locking member comprises a cam that is mounted externally on the hand lever for engagement with a corresponding locking surface on the face of the stationary cam member. As a modification, disc brake means can be provided that are operable by the cam means carried by the rotatable hand lever.

While the invention is particularly suitable for use with pivoted circular saw frames, the inventive concepts are also applicable to circular saws that are vertically displaceable on vertical pipes connected with the base.

BRIEF DESCRIPTIONS OF THE DRAWINGS

Other objects and advantages of the invention will become apparent from a study of the following specification when viewed in the light of the accompanying drawing, in which.

DETAILED DESCRIPTION

Figure 1:
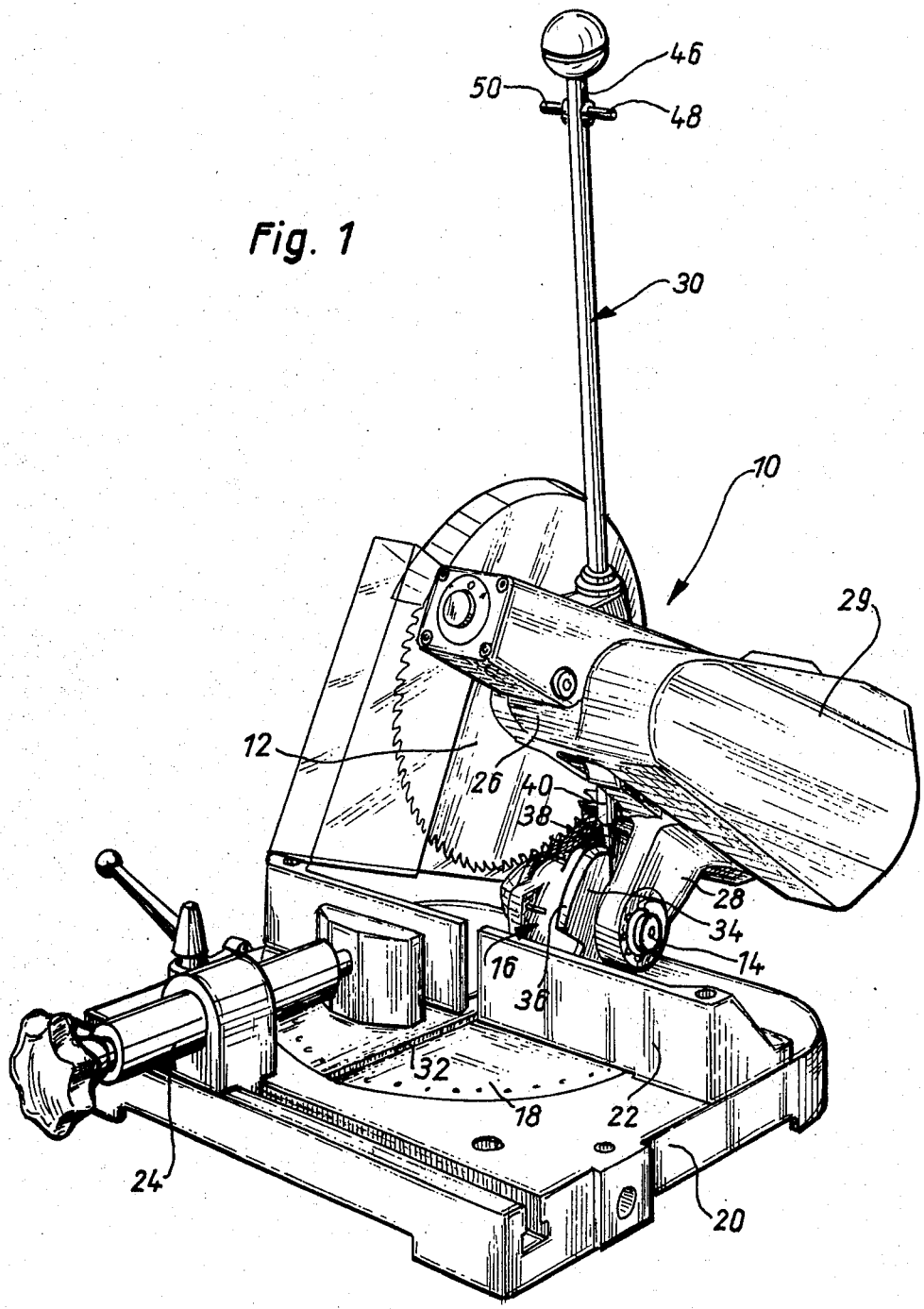
FIG. 1 is a perspective view of a circular saw apparatus including the safety locking means of the present invention, the saw frame being illustrated in its non-cutting position.
Figure 2:
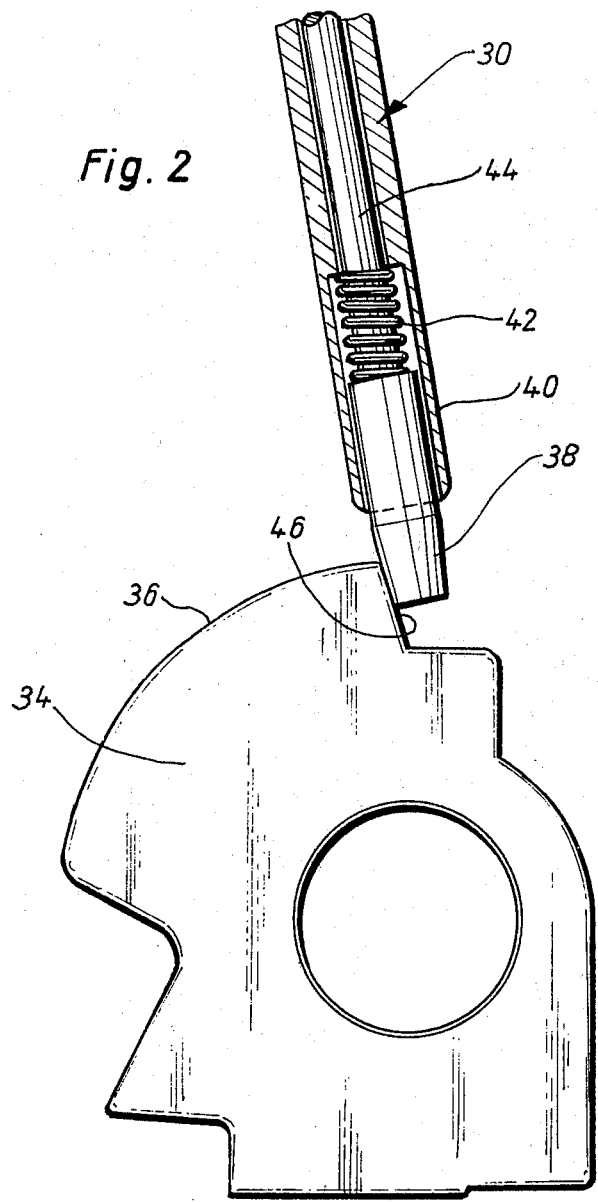
FIGS. 2–4 are detailed side elevational views of first, second and third embodiments, respectively, of the safety locking means of the present invention.

Referring first more particularly to FIGS. 1 and 2, the saw frame means 10 (which includes the rotary circular saw blade 12, the drive motor and connecting belt means, not shown, and the protective cover 29) is pivotally connected with the base 20 by horizontal pivot shaft 14 and bearing block 16. The bearing block is mounted on the carrier plate 18 which in turn is rotatably connected with the base for adjusting the angle of cutting relative to a work piece clamped to the slotted work piece stop on the base by clamping means 24. The saw frame means includes a body portion 26 and an arm portion 28. Hand lever 30 is connected with the saw frame means for pivoting the saw frame from the non-cutting position toward the cutting position. The saw frame is so designed that its center of gravity is arranged relative to the pivot shaft 14 to bias the saw frame toward the illustrated non-cutting position.

In accordance with the present invention, safety locking means are provided for locking the saw frame 10 in the non-cutting position, thereby preventing the saw frame from swinging down for some unforeseen reason and thus possibly causing an accident. To this end, a curve plate 34 which defines a stationary locking member is secured to the bearing block 16 adjacent the pivot shaft 14. As shown in FIG. 2, the curved plate has a curved convex surface 36 generally concentric with the pivot shaft 14, and an end surface 46 which extends generally radially inwardly toward the pivot shaft. A movable locking member is movably connected with a saw frame for cooperation with the stationary locking member, said movable locking member comprising a locking pin 38 which is axially displaceable in a counterbore contained in the lower end portion 40 of the hand lever 30. Compression spring 42 biases the locking pin downwardly toward the circumferential surface of the curved plate 34, said spring being arranged concentrically about a releasing rod 44 that is screw threadably connected at its lower end with the locking pin 38 and extends upwardly within a bore contained in the hand lever 30. At its upper end, the rod is connected with an operating member that is vertically movable in slot 46 contained in the hand lever, said operating member having lateral projections 48 and 50.

In operation, upon retraction of rod 44 within the hand lever 30 by handle means 48, 50, locking pin 38 is withdrawn into the counterbore against the restoring force of compression spring 42, and when the lateral surface of locking pin 38 clears the end surface 46 on the stationary locking member, the saw frame 10 is released for displacement by lever 30 toward the cutting position. When hand lever 30 is released, the saw frame is displaced by gravity toward the illustrated non-cutting position, and during this travel of the saw frame, the free extremity of the locking pin is biased by spring 42 into frictional engagement with curved surface 36. When the saw frame reaches the illustrated non-cutting position, the locking pin is extended to cause the lateral surface thereof to engage cam end surface 46, thereby locking the saw frame in the non-cutting position.

Figure 3:
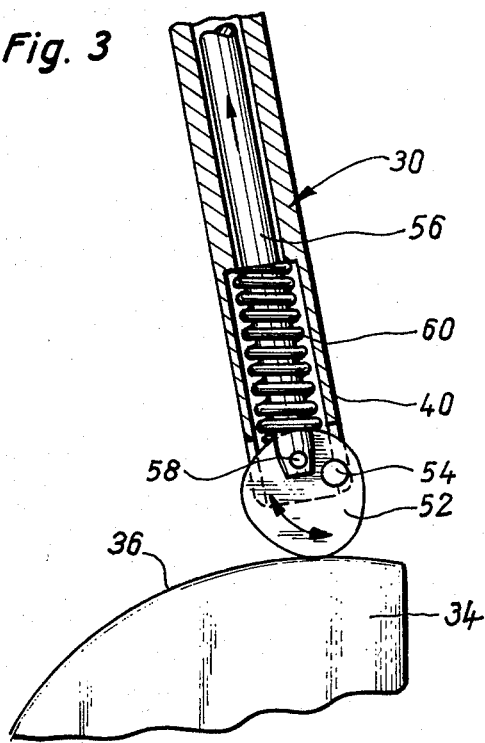

Referring now to the modification of FIG. 3, the movable locking member comprises a cam disk 52 which is pivotally connected with the frame by pivot shaft 54 which extends parallel with frame pivot shaft 14. This cam disk is also pivotally connected by pivot pin 58 with the lever end of releasing rod 56 which is axially displaceable in hand lever 30 (in the same manner as the releasing rod 44 of FIGS. 1 and 2). Compression spring 60 biases cam disk 52 into locking engagement with the curved convex surface 36 on the stationary locking member 34. Thus, when the actuating rod 56 is retracted in hand lever 30 by the operating means 48, 50, cam disk 52 is released from curved surface 36, thereby permitting the saw frame to be pivoted toward the cutting position. When the saw frame is returned to the non-cutting position and the operating means 48, 50 is released, cam 52 is pivoted into locking engagement with the curved surface 36.

Figure 4:
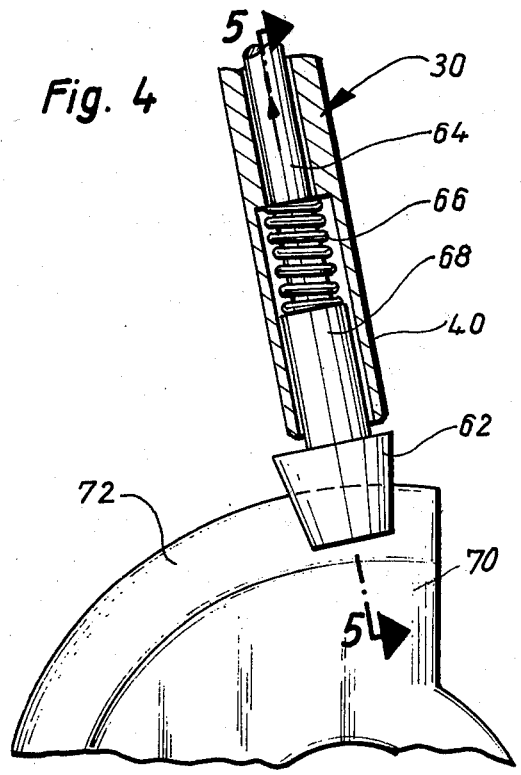
Figure 5:
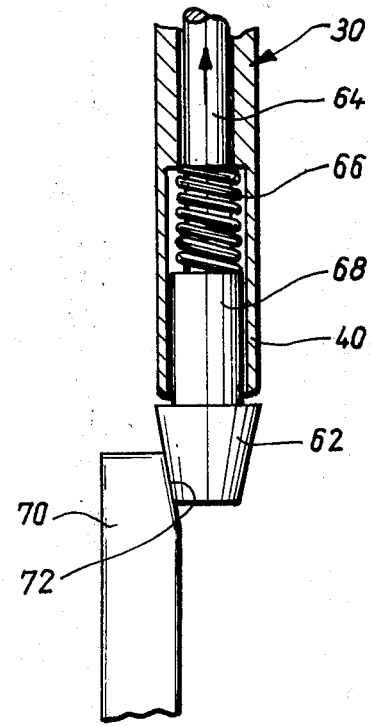
FIG. 5 is a sectional view taken along line 5—5 of FIG. 4.

In the modification of FIGS. 4 and 5, the movable locking member 62 comprises a truncated conical roller member 62 adapted to engage a corresponding tapered surface 72 contained on the face of curved plate 70, which tapered surface 72 is concentric with the frame pivot axis. The roller 62 is connected with a cylindrical member 68 which is guided within the counterbore contained in the lower end 40 of hand lever 30. Compression spring 66 is arranged concentrically about the lower end of axially displaceable releasing rod 64 which is threadably connected with cylindrical member 68, thereby biasing the roller 62 into locking engagement with the tapered locking surface 72. Retraction of rod 64 by handle means 48, 50 releases the roller 62 from the locking surface 72, whereupon saw frame 10 is released for pivotal movement toward the cutting position.

Figure 6:
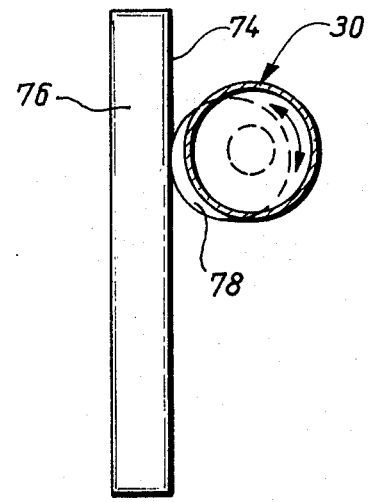
FIG. 6 is a top view, with certain parts removed, of a fourth embodiment of the invention.

In the modification of FIG. 6, the hand lever 30 is connected with the saw frame 10 for rotation about its axis, said hand lever 30 having connected thereto an external cam member 78 that projects radially outwardly for engagement with a corresponding locking surface 74 carried on the adjacent face of stationary locking member 76. Torsion spring means, not shown, rotatably biases hand lever 30 about its axis to effect locking engagement between cam 78 and the locking surface on the stationary locking member 76. Upon rotation of the hand lever 30 about its longitudinal axis, cam member 78 is released from the locking surface on the stationary locking member 76, thereby releasing the saw frame 10 for pivotal travel toward the cutting position.

Figure 7:
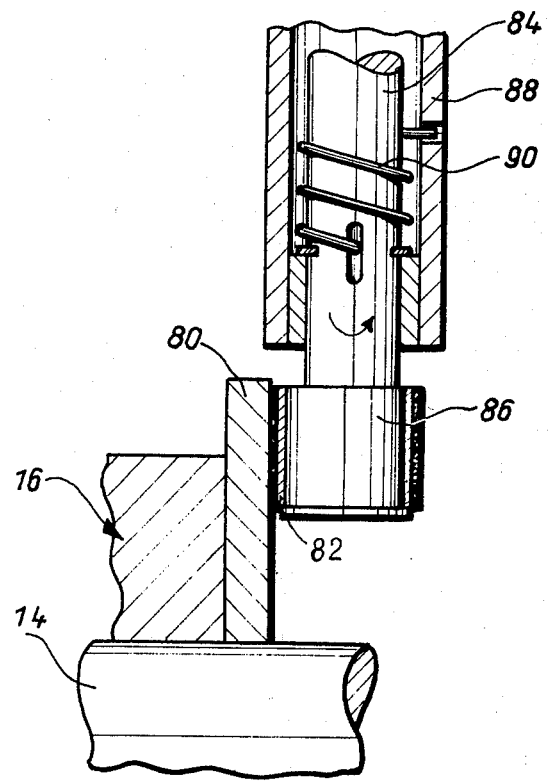
FIg. 7 is a side elevational view of a fifth embodiment of the invention.

In the modification of FIG. 7 the stationary locking member forms a disk brake member 80 arranged coaxially to said frame pivot axis 14. A brake shoe 82 is provided for this disk brake member 80, said brake shoe being rotationally mounted on an eccentric 86 formed integral with the rod 84. The rod 84 extends through a hand lever 88 mounted to the saw frame, and a torsion spring 90 tends to turn the rod 84 such that the brake shoe 82 will at all times engage the disk brake member 80. The upper end of the rod 84 is provided with a control handle, said handle to be turned in the direction of the arrow for releasing the saw frame. When the control handle or the rod 84 resp. are released, the brake shoe 82 will, under the action of spring 90 of the eccentric 86, come into engagement with the locking member 80 and thus lock the saw frame in feeding direction.

While in accordance with the Patent Statutes the preferred forms and embodiments of the invention have been illustrated and described, it will be apparent that various modifications may be made in the apparatus described without deviating from the inventive concepts set forth above.

What is claimed is:

1. In a circular saw apparatus including a base (20) including bearing block means (16); and circular saw means including a frame (10) pivotally connected with said bearing block means for movement between cutting and non-cutting positions relative to said base, a circular saw (12) connected with said frame for rotation about an axis parallel with the frame pivot axis, means on said frame for rotatably driving said circular saw, means biasing said frame toward the non-cutting position, and hand lever means (30) connected with said frame for pivoting the frame from the non-cutting position toward the cutting position;

the improvement which comprises locking means for releasably locking said frame in the non-cutting position relative to said base, said locking means including a. a stationary locking member (34) connected with said bearing block means, said stationary member having thereon a curved convex locking surface (36) concentric with the pivot axis of said frame, said locking surface containing an end abutment surface (46) angularly arranged relative to said curved locking surface;

b. a movable locking member (38) connected with one end of said handle means adjacent said stationary locking member for axial displacement relative to said handle means;

c. spring means (42) biasing said movable locking member axially relative to said handle means toward normal frictional end engagement with said convex surface during pivotal displacement of said frame between the non-cutting and cutting positions, said end abutment surface being so arranged that when the frame is in the non-cutting position, said movable locking member is axially displaced by said spring means toward an extended position in which a lateral surface of the movable locking member is in locking engagement with said stationary abutment surface; and d. means (44) for axially retracting said movable locking member from its extended position, thereby to release said frame for pivotal displacement toward the cutting position.

2. In a circular saw apparatus including a base (20); and circular saw means including a frame (10) pivotally connected with said base for movement between cutting and non-cutting positions relative to said base, a circulAr saw (12) connected with said frame for rotation about an axis parallel with the frame pivot axis, means biasing said frame toward the non-cutting position, and hand lever means (30) connected with said frame for pivoting the frame from the non-cutting position toward the cutting position;

the improvement which comprises
locking means for releasably locking said frame in the non-cutting position relative to said base, said locking means including
 a. a stationary locking member (34) connected with said base, said stationary member having thereon a curved convex locking surface arranged concentrically about the frame pivot axis;
 b. a movable locking member movably connected with said frame, said movable locking member comprising an eccentric disc (52) pivotally connected with said frame for movement about a pivot axis parallel to the frame pivot axis;
 c. compression spring means (60) biasing said movable locking member into locking engagement with said locking surface when said frame is in the non-cutting position; and
 d. releasing means (56) connected with said hand lever means for displacing said locking member against the restoring force of said spring means to release said locking member from engagement with said locking surface.

3. In a circular saw apparatus including a base (20); and circular saw means including a frame (10) pivotally connected with said base for movement between cutting and non-cutting positions relative to said base, a circular saw (12) connected with said frame for rotation about an axis parallel with the frame pivot axis, means biasing said frame toward the non-cutting position, and hand lever means (30) connected with said frame for pivoting the frame from the non-cutting position toward the cutting position;

the improvement which comprises
locking means for releasably locking said frame in the non-cutting position relative to said base, said locking means including
 a. a stationary locking member (70) connected with said base, said stationary member having thereon a tapered curved convex locking surface (72) arranged concentrically about the frame pivot axis;
 b. a movable locking member (62) movably connected with said frame, said movable locking member comprising a truncated conical roller member (62) which converges in the direction of the frame pivot axis, said locking surface comprises a portion of a corresponding truncated surface (72) contained on one face of the stationary locking member;
 c. spring means (66) biasing said movable locking member into locking engagement with said locking surface when said frame is in the non-cutting position; and
 d. releasing means (64) for displacing said locking member against the restoring force of said spring means to release said locking member from engagement with said locking surface.

4. In a circular saw apparatus including a base (20); and circular saw means including a frame (10) pivotally connected with said base for movement between cutting and non-cutting positions relative to said base, a circular saw (12) connected with said frame for rotation about an axis parallel with the frame axis, means biasing said frame toward the non-cutting position, and hand lever means (30) connected with said frame for pivoting the frame from the non-cutting position toward the cutting position;

the improvement which comprises
locking means for releasably locking said frame in the non-cutting position relative to said base, said locking means including
 a. a stationary locking member (76) connected with said base, said stationary member having thereon a lateral locking surface (74) arranged concentrically about said frame pivot axis;
 b. a movable locking member (78) movably connected with said frame, said hand lever means being rotatably connected with said frame, said movable locking member comprising a cam (78) mounted externally on the lower end of said hand lever means for engagement with said locking surface;
 c. spring means rotatably biasing said movable locking member into locking engagement with said locking surface when said frame is in the non-cutting position; and
 d. releasing means for displacing said locking member against the restoring force of said spring means to release said locking member from engagement with said locking surface.

5. Apparatus as defined in claim 4, wherein said spring means comprises a torsion spring connected between said hand lever means and said frame for rotatably biasing said hand lever means about its longitudinal axis in a direction causing locking engagement between said movable locking member and said locking surface.

6. In a circular saw apparaus including a base (20); and circular saw means including a frame (10) pivotally connected with said base for movement between cutting and non-cutting positions relative to said base, a circular saw (12) connected with said frame for rotation about an axis parallel with the frame pivot axis, means biasing said frame toward the non-cutting position, and hand lever means (30) connected with said frame for pivoting the frame from the non-cutting position toward the cutting position;

the improvement which comprises
locking means for releasably locking said frame in the non-cutting position relative to said base, said locking means including a. a stationary locking member connected with said base, said stationary member having thereon a locking surface;
b. a movable locking member movably connected with said frame;
c. spring means biasing said movable locking member into locking engagement with said locking surface when said frame is in the non-cutting position;
d. releasing means for displacing said locking member against the restoring force of said spring means to release said locking member for engagement with said locking surface; and
e. disk brake means for frictionally resisting movement of said frame member between its cutting and non-cutting positions.

7. Apparatus as defined in claim 6, wherein said disk brake means includes a disk brake member (80) arranged on said stationary locking member coaxially with respect to said frame pivot axis, said hand lever means being connected with said frame for rotation about its longitudinal axis, said movable locking member comprising a cam (86) carried by said hand lever means for operating said disk brake means, said spring means comprising a torsion spring (90) normally rotating said hand lever in a direction to apply said brake means to prevent pivotal movement of said frame toward the cutting position.

* * * * *